(12) United States Patent
Dove et al.

(10) Patent No.: US 7,006,497 B2
(45) Date of Patent: Feb. 28, 2006

(54) TRAFFIC MERGING SYSTEM

(75) Inventors: Jason Dove, Novato, CA (US); Brian Semple, Novato, CA (US); Andre Tanguay, Santa Rosa, CA (US); James Lotz, Napa, CA (US)

(73) Assignee: Calix Networks, Inc., Petaluma, CA (US)

(*) Notice: Subject to any disclaimer, the term of this patent is extended or adjusted under 35 U.S.C. 154(b) by 971 days.

(21) Appl. No.: 09/874,904

(22) Filed: Jun. 4, 2001

(65) Prior Publication Data

US 2002/0181475 A1  Dec. 5, 2002

(51) Int. Cl.
H04L 12/28 (2006.01)
H04L 12/56 (2006.01)
H04L 12/66 (2006.01)

(52) U.S. Cl. ............... 370/390; 370/352; 370/395
(58) Field of Classification Search ........ 370/235–259, 370/352–395, 431–458, 464–473, 535, 537; 375/260, 295, 316; 398/47–56, 75
See application file for complete search history.

(56) References Cited

U.S. PATENT DOCUMENTS

| | | | |
|---|---|---|---|
| 3,652,798 A | 3/1972 | McNeilly et al. ....... 179/15 AL |
| 4,623,996 A | 11/1986 | McMillen .................... 370/418 |
| 4,674,082 A | 6/1987 | Flanagin et al. ............ 370/510 |
| 4,835,763 A | 5/1989 | Lau .............................. 370/16 |
| 4,899,383 A | 2/1990 | Einolf et al. ................ 370/510 |
| 5,003,531 A | 3/1991 | Farinholt et al. .......... 370/16.1 |
| 5,150,356 A | 9/1992 | Tsutsui ....................... 370/16.1 |
| 5,307,353 A | 4/1994 | Yamashita et al. ......... 371/11.2 |
| 5,327,420 A | 7/1994 | Lyles ......................... 370/397 |
| 5,365,521 A | 11/1994 | Ohnishi et al. ............ 370/352 |
| 5,392,280 A | 2/1995 | Zheng ........................ 370/353 |
| 5,396,494 A * | 3/1995 | Roposh ....................... 370/439 |
| 5,455,827 A | 10/1995 | Krause et al. ................ 370/68 |
| 5,570,344 A | 10/1996 | Fujii ........................... 370/217 |
| 5,572,513 A | 11/1996 | Yamamoto et al. ........... 370/16 |
| 5,621,773 A * | 4/1997 | Varma et al. ................ 375/368 |
| 5,625,629 A | 4/1997 | Wenk .......................... 370/347 |
| 5,751,696 A | 5/1998 | Bechtel et al. .............. 370/223 |
| 5,757,774 A | 5/1998 | Oka ............................ 370/242 |
| 5,781,320 A | 7/1998 | Byers ..................... 370/395.51 |
| 5,809,021 A | 9/1998 | Diaz et al. ................... 370/364 |
| 5,832,197 A | 11/1998 | Houji .................... 395/182.02 |
| 5,838,924 A | 11/1998 | Anderson et al. ....... 395/200.69 |
| 5,867,484 A | 2/1999 | Shaunfield ................... 370/254 |
| 5,889,773 A * | 3/1999 | Stevenson, III ............. 370/352 |
| 5,894,477 A | 4/1999 | Brueckheimer et al. .... 370/420 |
| 5,923,449 A | 7/1999 | Doerr et al. ................. 359/125 |

(Continued)

OTHER PUBLICATIONS

PCT/US02/17427 PCT Search Report, dated Aug. 28, 2002, 1 page.

(Continued)

Primary Examiner—Man U. Phan
(74) Attorney, Agent, or Firm—Silicon Valley Patent Group LLP

(57) ABSTRACT

Traffic is transported within a system in the form of TDM packets. These packets are generated at source line units and transported from the line units to a switch. The switch routes the packets to appropriate target line units based on information contained within the packet. At the switch, packets from the source line units may be merged. A gather function relies on each of the line units sourcing packets to exclusively drive lines at software-assigned timeslots within the packet. The switch performs a simple OR function of each byte in merging the packet payloads.

20 Claims, 11 Drawing Sheets

U.S. PATENT DOCUMENTS

| | | | | |
|---|---|---|---|---|
| 5,987,026 | A | 11/1999 | Holland | 370/353 |
| 6,014,431 | A | 1/2000 | McHale et al. | 379/93.07 |
| 6,128,300 | A | 10/2000 | Horton | 370/463 |
| 6,167,041 | A * | 12/2000 | Afanador | 370/353 |
| 6,169,749 | B1 * | 1/2001 | Dove et al. | 370/474 |
| 6,181,694 | B1 | 1/2001 | Pickett | 370/458 |
| 6,192,399 | B1 | 2/2001 | Goodman | 379/93.09 |
| 6,195,355 | B1 | 2/2001 | Demizu | 370/397 |
| 6,205,155 | B1 | 3/2001 | Parrella et al. | 370/462 |
| 6,219,354 | B1 | 4/2001 | Fink et al. | 370/463 |
| 6,240,084 | B1 | 5/2001 | Oran et al. | 370/463 |
| 6,310,891 | B1 * | 10/2001 | Dove et al. | 370/470 |
| 6,314,102 | B1 | 11/2001 | Czerwiec et al. | 379/93.01 |
| 6,359,859 | B1 * | 3/2002 | Brolin et al. | 370/218 |
| 6,359,889 | B1 | 3/2002 | Tazaki et al. | 370/395.61 |
| 6,362,908 | B1 | 3/2002 | Kimbrough et al. | 359/163 |
| 6,408,033 | B1 * | 6/2002 | Chow et al. | 375/260 |
| 6,501,758 | B1 | 12/2002 | Chen et al. | 370/395.1 |
| 6,545,781 | B1 | 4/2003 | Chang et al. | 398/51 |
| 6,563,818 | B1 | 5/2003 | Sang et al. | 370/379 |
| 6,628,651 | B1 * | 9/2003 | Ryan et al. | 370/369 |
| 6,633,566 | B1 * | 10/2003 | Pierson, Jr. | 370/395.1 |
| 6,643,254 | B1 | 11/2003 | Kajitani et al. | 370/217 |
| 6,657,952 | B1 | 12/2003 | Shiragaki et al. | 370/223 |
| 6,665,263 | B1 | 12/2003 | Kawabata et al. | 370/219 |
| 6,721,273 | B1 * | 4/2004 | Lyon | 370/235 |
| 6,721,502 | B1 | 4/2004 | Al-Salameh et al. | 398/3 |
| 6,731,832 | B1 | 5/2004 | Alvarez et al. | 385/16 |
| 6,735,191 | B1 * | 5/2004 | Hosein | 370/352 |
| 6,760,327 | B1 | 7/2004 | Manchester et al. | 370/364 |
| 6,771,663 | B1 | 8/2004 | Jha | 370/473 |
| 6,775,229 | B1 | 8/2004 | Mo et al. | 370/220 |
| 6,798,784 | B1 * | 9/2004 | Dove et al. | 370/463 |

OTHER PUBLICATIONS

PCT/US02/17427 Int'l Preliminary Examination Report, dated Mar. 19, 2003, 3 pages.

PCT/US02/17515 PCT Search Report, dated Dec. 12, 2002, 1 page.

PCT/US02/17515 Int'l Preliminary Examination Report, dated Nov. 12, 2003, 7 pages.

PCT/US02/117625 PCT Search Report, Nov. 21, 2002, 1 page.

PCT/US02/117625 Int'l Preliminary Examination Report, dated Oct. 30, 2003, 3 pages.

Office Action dated Mar. 18, 2005, U.S. Appl. No. 09/874,402, filed Jun. 4, 2001, (13 pages).

Response to Office Action filed Jun. 20, 2005 for U.S. Appl. No. 09/874,402, filed Jun. 4, 2001, (12 pages).

* cited by examiner

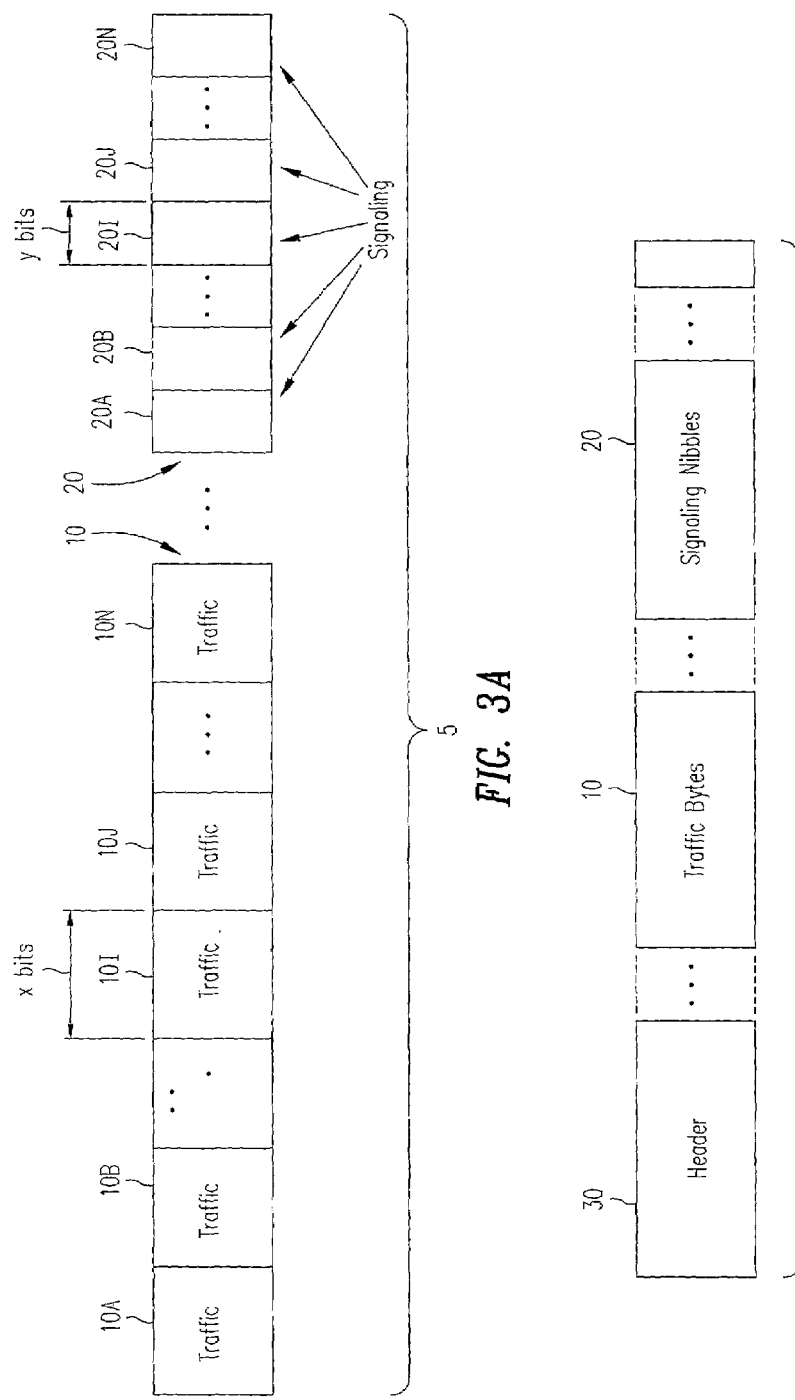

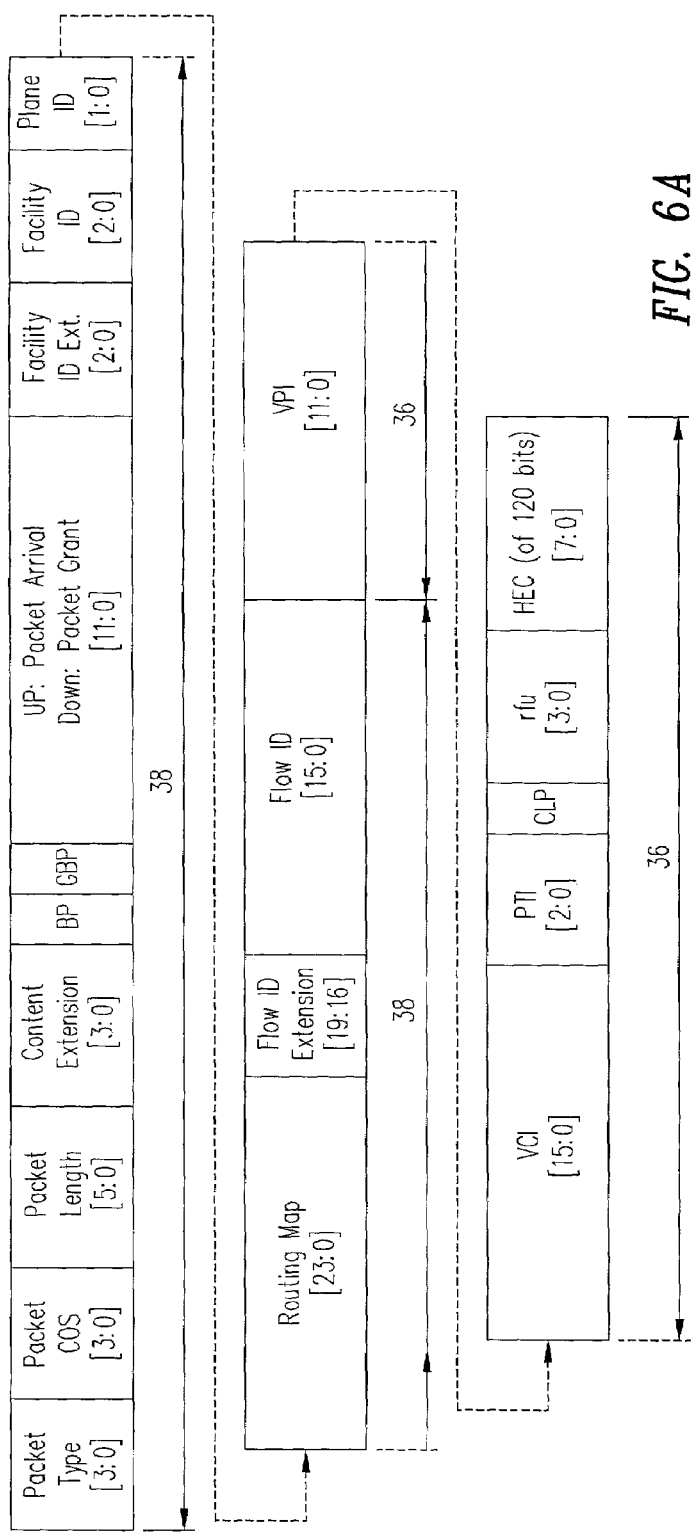
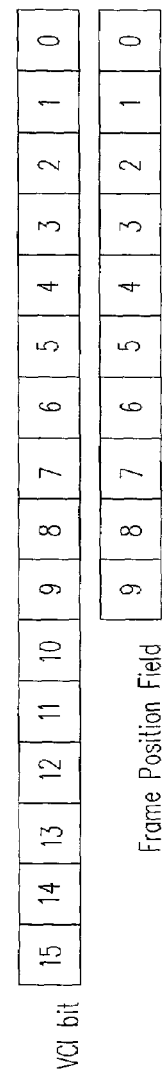
FIG. 6A
FIG. 6B

TRAFFIC MERGING SYSTEM

BACKGROUND OF THE INVENTION

As telecommunications networking technologies move from analog to digital transmission, there is a need to maximize usage of the bandwidth available for voice and data transmission.

DS0 (Digital Signal level 0–64 kbps traffic stream) is the smallest increment of manageable bandwidth and is typically used to carry voice information. It is common to transport DS0 traffic within a system in messages having the form of Asynchronous Transfer Mode (ATM) cells. An ATM cell is a fixed-length (53 byte) message comprised of a 5 byte header and 48 byte payload. The DS0 portion of this payload, commonly B-channel and signaling information, is stored in an interleaved manner.

The Synchronous Optical Network (SONET) standard is a set of coordinated ITU, ANSI and Bellcore standards that define a hierarchical set of transmission rates and transmission format.

SUMMARY OF THE INVENTION

A method of merging traffic is disclosed that includes receiving a plurality of messages from at least two sources wherein each message contains a frame position field value. Each of the messages are positioned in identical frame positions within a 6 millisecond superframe at the source of each of the at least two messages. The frame position field values contained within each of the at least two messages are identical. The messages not intended for merging are assigned a unique position in the 6 millisecond superframe and positioned within the unique positions. The at least two messages containing identical frame position field values are merged to create a merged message. The merged message is routed to a port.

BRIEF DESCRIPTION OF THE DRAWINGS

FIG. 3A illustrates bytes of traffic arranged in a contiguous manner, and nibbles of signaling also arranged in a contiguous manner.

FIG. 3B illustrates one embodiment that combines a header with bytes of traffic arranged with nibbles of signaling, of the type illustrated in FIG. 3A.

FIG. 6A illustrates packet header.

FIG. 6B illustrates VCI sequence number fields.

Use of the same reference symbols in different figures indicates similar or identical items.

DETAILED DESCRIPTION OF THE PREFERRED EMBODIMENTS

Figure 1A:
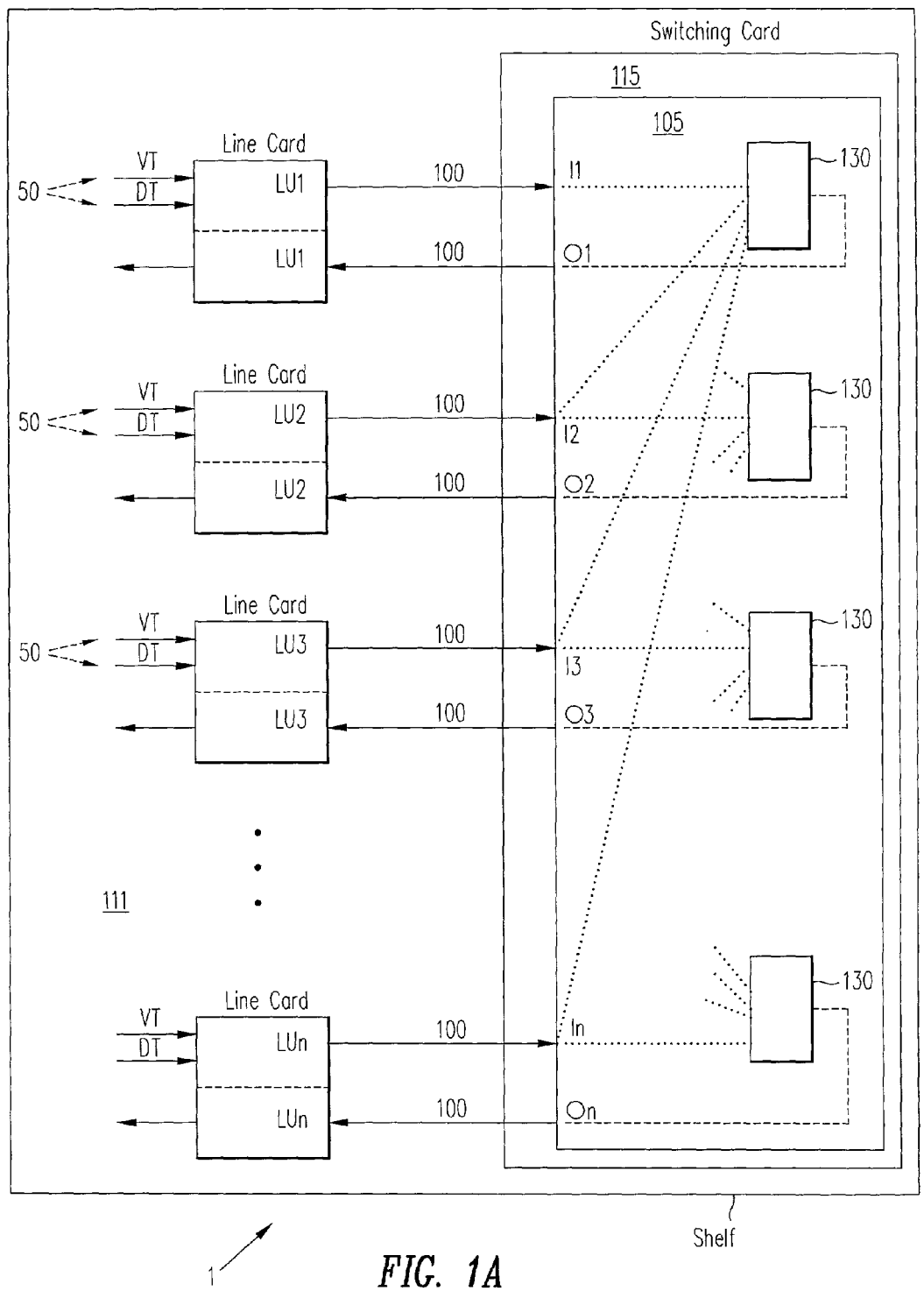
FIG. 1A illustrates a representative data transfer system in accordance with the invention.

Two closely interrelated segments of multi-service networking are "access" and "transport." "Access" refers to the technology by which users connect to a wide area network ("WAN"), and through it, to service providers or other users connected to the WAN at locations remote from the user. "Transport" refers to the technologies that make up the fabric of the WAN itself, including those relating to the transmission of the users' information across the WAN.

One model of a high-speed access-and-transport network system for which detailed standards have been developed by the International Telecommunication Union ("ITU") is the "Broadband Integrated Services Digital Network" ("BISDN") "umbrella" model, which, in one widely regarded embodiment, can be characterized as Asynchronous Transport Mode ("ATM") over a Synchronous Optical Net-work ("SONET") transmission system ("ATM/SONET").

Thus, one conventional paradigm of a BISDN access-and-transport system contemplates, 1) the "gathering" of lower-level voice, video, and data signals in a variety of formats from a large number of individual users at a "user network interface" ("UNI") located at the edge of a WAN, 2) the "grooming" of those signals, first by "ATM-izing," or "cellification" of the signals, if necessary, into fixed-length ATM cells, then by packaging, or "mapping," the ATM cells into SONET synchronous payload envelope ("SPE") structures, or "SONET Traffic Stream" ("STS") frames, of incremental capacities using high-speed switching techniques and an addressing system of "pointers" and transport and path overhead ("TOH" and "POH"), and 3) the "scattering" of the signals out over the WAN to their in-tended destinations.

However, some concerns exist regarding the "ATM/SONET" paradigm as it pertains to certain types of traffic, viz., voice and video signals, which are inherently isochronous or plesiochronous (i.e., time-division-multiplexed ("TDM") traffic), as well as Internet Protocol ("IP") traffic, which, unlike both ATM and TDM traffic, is by nature "connectionless." While it is possible to ATM-ize both types of traffic, the resultant loss of bandwidth can greatly offset the increase in effective bandwidth afforded by the "statistical multiplexing" capabilities of ATM.

In light of the foregoing concerns, the assignee hereof has developed a novel, multi-functional, "hybrid" access-and-transport system, called the "C7" system, that is capable of supporting a wide variety of user interfaces, in terms of bandwidth, density, interface and application. It is a "hybrid" system, in that it is capable of efficiently gathering, grooming, and transporting both classical time division multiplexed ("TDM") and packet-switched (i.e., ATM, Multiprotocol Label Switching ("MPLS"), IP, Packet Over SONET ("POS"), and Frame Relay) types of traffic streams in their respective formats and protocols, thereby maximizing available bandwidth through the use of statistical multiplexing, while preserving or even improving the QoS level achievable in such a disparate traffic mix. The C7 system can be deployed in any of several different topologies, including linear point-to-point, ring, star, mesh or any combination of the foregoing. For more information see U.S. patent application Ser. No. 09/874,352 (now U.S. Pat. No. 6,798,784)

entitled "Concurrent Switching of Synchronous and Asynchronous Traffic" by J. Dove et al., which is incorporated herein by reference.

The word "GigaPoint" describes a point-to-point link using a transmission rate measured in gigabits per second (Gbps). FIG. 1A is an illustration of one embodiment of a data transfer system 1 that establishes a representative environment of the present invention. The representative data transport system operates at a Gbps rate and is fully disclosed in co-pending U.S. patent application Ser. No. 09/874,402 entitled BACKPLANE BUS, which is herein incorporated by reference for all purposes.

System 1 provides an efficient means of transporting voice over a packet network with no need for expensive echo-cancellers is provided. Only minimal cross-connecting capabilities at the DS0 level are required as opposed to sophisticated cross-connects found in conventional systems.

Telephony traffic, such as voice and data traffic, is transmitted from a line card (i.e., a line unit) to a switching card (i.e., a switch). If the traffic received in the line unit is analog (e.g., audio or voice traffic), the traffic is sampled and converted into digital traffic (i.e., DS0s). The line unit directs the traffic to an outgoing port of the line unit. All telephony traffic in digital form is received serially.

Figure 1B:
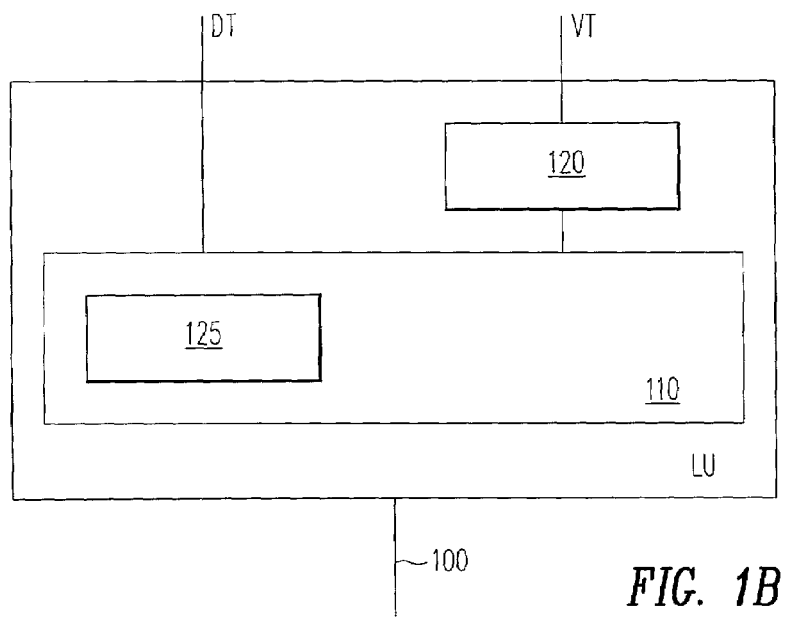
FIG. 1B illustrates a line unit used in the system of FIG. 1A.

Data is transported between a number of line units (LU1–LUn where 1<n<n+1) (each line unit handling upstream and downstream traffic) and a Routing Crossconnect (RC) 105 over a number of data transport buses 100 (a.k.a. "GigaPoint bus"). RC 105, sometimes referred to as the Routing and Arbitration Processor (RAP) switch fabric, is the switching core on RAP assembly 115. The function of RAP 115 is to direct traffic from incoming ports to any outgoing port based on information maintained in RAP 115 itself or embedded within the data traffic. The term "upstream" refers to the traffic from subscriber ports (i.e., ports on the upstream portion of each line unit that are connected to users) to RAP 115 while "downstream" refers to the traffic from RAP 115 to the subscriber ports (i.e., ports on the downstream portion of each line unit that are connected to users). Access Processors (AP) 110 are located within the line units (FIG. 1B). A function of AP 110 is to adapt traffic such as packets and STS to a format that can be transported over data transport bus 100 to RAP 115. An AP 110 may be installed in each line unit slot or within RAP 115 and connected to RC 105 at the Physical layer (PHY) interface (i.e. data transfer bus 100). PHY interfaces for C7 line units include: (1) POTS line unit where the CODEC converts analog voice to/from a serial data stream which interfaces directly to AP 110; (2) DSL line unit where the DSL PHY is the physical interface for DSL line units and DSL PHYs may support single or multiple interfaces in DSL line formats such as DMT (discrete multitone); (3) DS1 line unit where the DS1 Framer and Line Interface Unit (LIU) are the physical interface for T1/DS1 cards; and (4) SLU line unit where the SONET PHY device is the physical interface for SONET line units and different SONET PHY devices may support single or multiple interfaces such as OC-3 and OC-12.

As seen in FIG. 1A, a number of line units (LU1–LUn) are connected to RC 105 which is located on RAP 115. There are two RAP 115 for redundancy (i.e., at any given time, one RAP is 'active' while the other RAP is 'redundant') and each RAP 115 is connected to the line units via data transfer buses 100. Voice traffic (VT) and data traffic (DT) are carried by lines 50 enter incoming ports (not shown) on the upstream portion of each line unit. Each line unit (LU1–LUn) has a number of outgoing ports (1–N where 1<N<N+1) exiting the line unit (LU1–LUn). RC 105 includes a number of input ports (I1–In where 1<n<n+1). There are an equal number of output ports (O1–On where 1<n<n+1) on RC 105 as input ports (I1–In).

As described in detail below, when voice traffic and data traffic is in the form of packets, each line unit (LU1–LUn) decodes information contained in incoming voice traffic VT and data traffic DT and compares that information to information stored within the line unit to determine the intended destination of the traffic. The line unit (LU1–LUn) then directs the traffic to an appropriate output port (1–N) based on the intended destination of the traffic. The line units (LU1–LUn) are pre-programmed with which output ports (1–N) the traffic is destined to. Each output port (1–N) represents a particular destination for the traffic. When voice traffic is in the form of digital samples (i.e., from a CODEC or DS1), the intended destination is pre-programmed by software in the line unit based on physical port number. The destination is a function of the physical port the data is coming from. In both cases, after generating fixed length packets containing the digital samples, the line unit appends a Routing Map to the data (i.e. the packet) which indicates the intended destination to RAP 115. Routing of the traffic occurs at RAP 115.

Figure 2A:
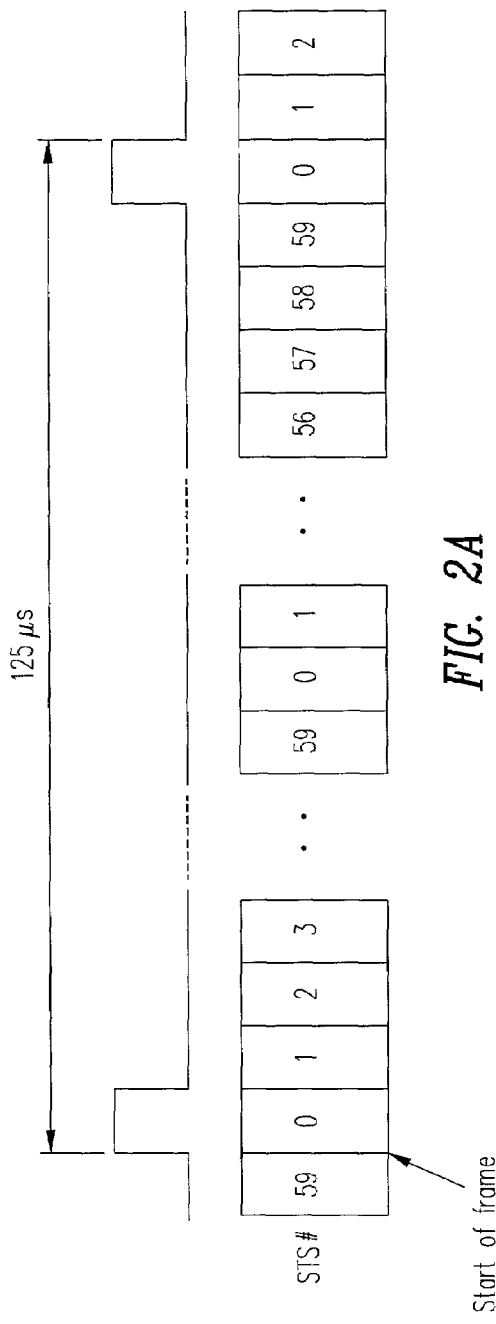
FIG. 2A illustrates a channel numbering with respect to frame sync.

An example of traffic routing using the system of FIG. 1A is described hereafter. VT and DT enter the upstream path of a line unit, for example LU1. Line unit LU1 decodes information contained within the incoming VT and DT relating to the intended destination of the traffic. LU1 compares the intended destination to pre-programmed information within the line unit. The pre-programmed information correlates outgoing ports (1–N) on line unit LU1 to the intended destination which may result, for example, in a portion of the incoming traffic being directed to a destination connected to output port O3 of RC 105 while another portion of the incoming traffic is directed to a destination connected to output port O1 of RC 105. Still more traffic may be directed to destinations connected to output ports O2 and On, respectively, of RC 105. Each output port is associated with an output multiplexer 130 which merely routes the traffic from an input port to its respective output port on RC 105. The line unit LU1 appends a Routing Map to the data and sends the data to I1 on RC 105. RC 105 directs the traffic to the appropriate outgoing port based on the Routing Map. Data transport bus 100 is based on a 125 microsecond Synchronous Optical Network (SONET) frame and a 6 millisecond custom superframe. FIG. 2A shows an example of byte arrangement in a data transport bus 100. Data transport bus 100 can carry the equivalent of 60 SONET Traffic Stream-1(STS-1) channels, or 3.1104 Gbps. The frame includes a pattern of 60 byte intervals or channels (0–59) that repeats 810 time every frame. Each byte within an interval represents one STS-1 worth of bandwidth (810 bytes/frame). If an interval is assigned to Synchronous or Asynchronous traffic, the interval carries fixed length packet (FLP) traffic. Interval 0 carries 5 bytes of overhead every frame. This overhead is used for control purposes.

Figure 2B:
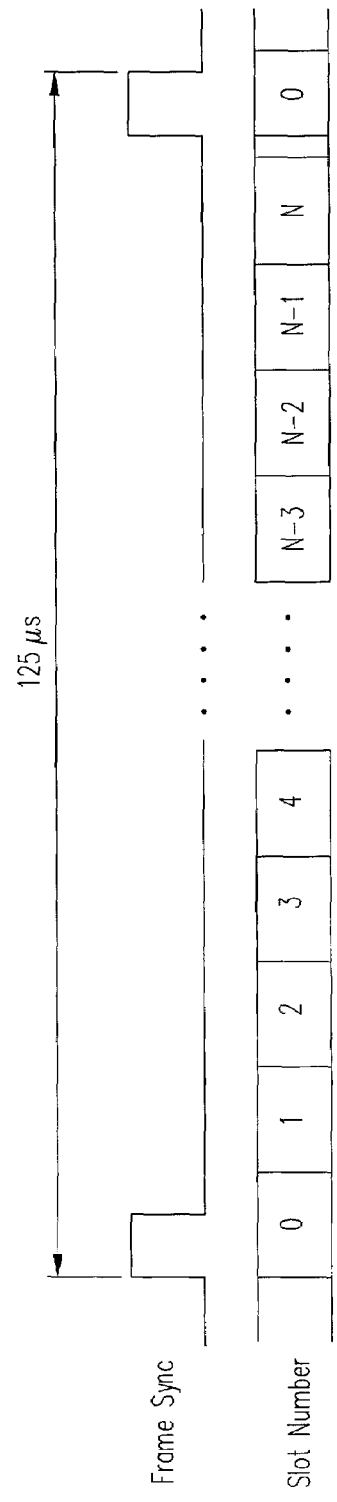
FIG. 2B illustrates a 125 microsecond frame used in the backplane bus.

FIG. 2B illustrates how fixed length packets are distributed across a data transfer frame, with a remainder at the end of the frame. There are N slots per 125 microsecond frame. A frame sync pulse delineates the start of a 125 microsecond frame. For every STS-1 interval (a.k.a. "STS channel") assigned to synchronous traffic, 810 bytes (805 bytes for STS Interval 0) are made available to carry synchronous fixed length packets. 810 bytes divided by 64 bytes per packet yields 12.65625 packets per slot per interval per frame. Fixed length packets must start on packet slot boundaries, and any fractional packet slot at the end of a frame is not used to carry synchronous traffic.

The bandwidth of the data transport bus 100 is 3.1104 gigabits per second. At the 3.1104 gigabits per second bandwidth for the data transport bus 100, a maximum limit for the number of synchronous packets that may be sent in one frame is set at 758 packets. This limit can be reached when all STS-1 intervals are assigned to synchronous traffic (i.e., if fewer intervals are assigned, fewer packets can be transported). After the maximum number of packet slots have gone by on any single frame of data transport bus 100, no more synchronous fixed length packets are sent until the next frame.

Telephony data traffic is transported within a data transfer system 1, such as the one described above, in the form of messages 5 (FIG. 3A) which may be fixed size (called "cells" or "fixed length packets" (FLP)) or variable size (called "packets") depending on the embodiment. The format of the positions of the traffic 10 and signaling 20 in messages 5 is different than previous approaches which interleaved traffic and signaling. In one example, there is one nibble (i.e., four bits) of signaling associated with each byte of voice sample (called a b-channel where one channel is equivalent to one byte).

Each message 5 is formatted in a specific manner. There are samples (i.e., bytes) of telephony traffic 10A, 10B . . . 10I . . . 10N (wherein $A \leq I \leq N$ and $B=A+1$) arranged in the message 5 in a contiguous manner relative to one another (herein the word "contiguous" is intended to mean that each sample 10I is followed immediately by another sample 10J without anything interleaving therebetween, except for the last sample 10N which is not followed by another sample). There is one unit of signaling 20A, 20B . . . 20I . . . 20N (wherein $A \leq I \leq N$ and $B=A+1$) for each sample of traffic. The signaling units 20A–20N are also arranged to be contiguous with one another. The contiguous nature of the cell arrangement allows data and signaling for a given voice channel to be carried within the same FLP.

One embodiment of message 5 includes a header 30 (FIGS. 3A & 3B) that precedes traffic 10. In this embodiment, there are up to twenty-four contiguous bytes of traffic (10A–10N wherein $A=0$ and $N=23$) and twelve contiguous bytes of signaling (20A–20N wherein $A=0$ and $N=11$ as there are two bytes of traffic for every byte of signaling, i.e., $x=2y$). The header 30 is embedded with information used to assist in routing and merging of message 5 (with other messages).

Figure 3C:
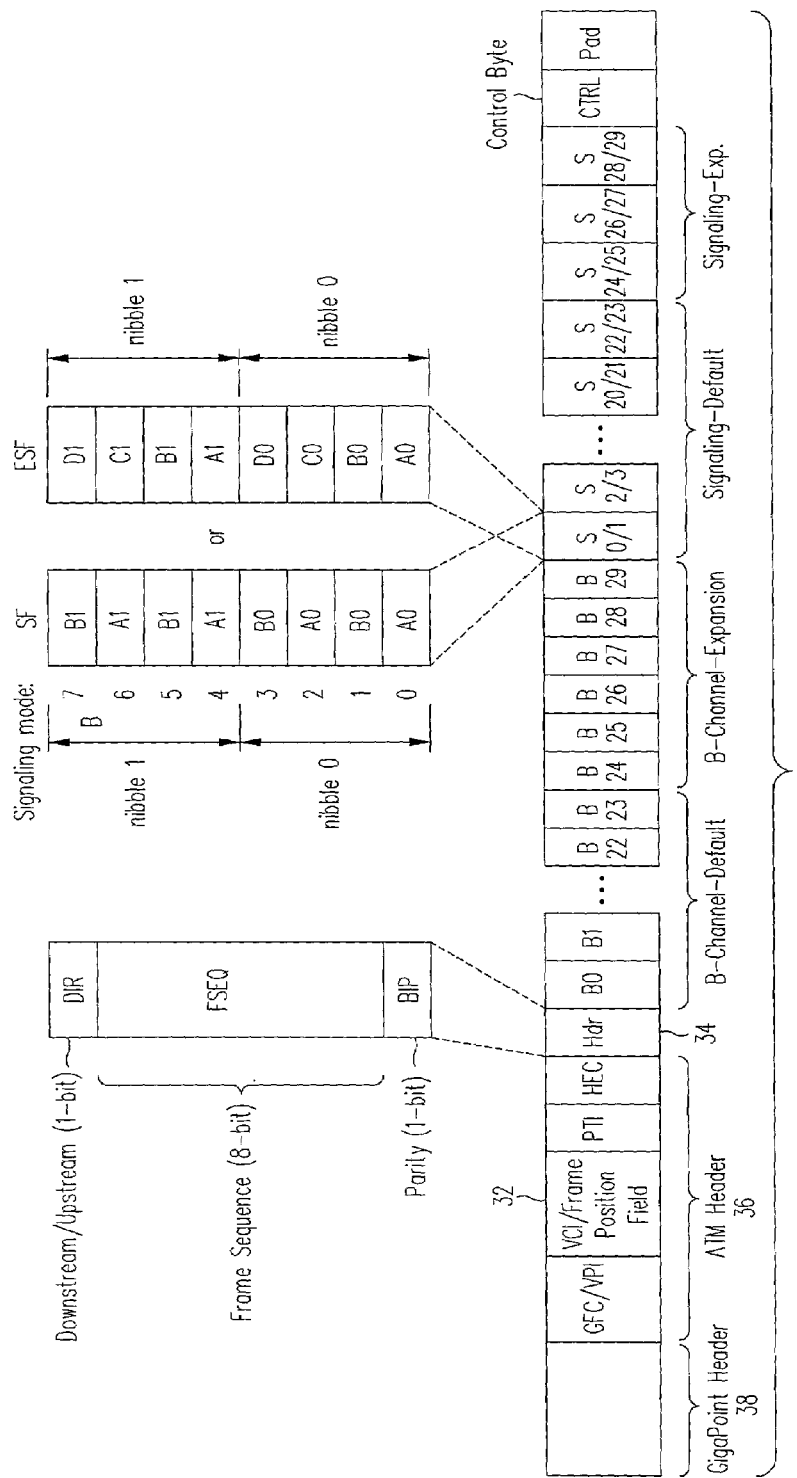
FIG. 3C illustrates an embodiment of a fixed length packet.

FIG. 3C illustrates the data format of another embodiment of a message 5 in the form of a FLP which includes a modified ATM cell that carries TDM payload. The term "payload" is used to indicate user data within a FLP. TDM payload includes DS0 and signaling information. TDM fixed length packets are identified within a 64-byte packet-type word, or FLP envelope 31. The FLP envelope 31 includes an 11-byte GigaPoint header 38 prepended to a 53-byte ATM cell. The payload is similar to the unstructured mode of ATM Adaptation Layer Type 1 (AAL-1). See ITU-T Recommendations for ATM, http://www-comm.itsi.disa.mil/itu/r_i36.html#I.363.1. AAL functions in support of constant bit rate, time-dependent traffic such as voice and video. The 53-byte ATM cell is a fixed-length message that includes a 5 byte ATM header 36 and 48 byte payload.

As seen in FIGS. 3C & 6A, header 38 carries specific information. Each packet slot within a frame is made up of a 16-byte header and a 48-byte payload. Header 38 includes the following components: Packet type field; packet class of service (COS); packet length field; backpressure (BP) state bits; extension field for context bits; upstream packet arrival/downstream packet grant field; routing map field; grant BP (GBP) field; Plane ID field; Facility ID field; Facility extension field; Flow ID extension field; and flow identifier field. The sizes and locations of the fields within header 38 may vary. ATM header 36 includes the following components: virtual port identifier (VPI); virtual connection identifier (VCI); payload type identifier (PTI); Cell Loss Priority (CLP); and header error check (HEC). The sizes and locations of the fields within header 36 may vary. The packet type field identifies data within a packet slot for routing within RC 105 and AP 110. Four bits are used to identify whether synchronous packets are multicast, TDM strictly scheduled, TDM loosely scheduled, or HOST type.

A HOST packet is a packet type used for processor communication between the line units and RAP 115. The COS field uses four bits to identify up to 16 levels of class of service for the current packet (though the COS field is not applicable to synchronous traffic). COS can be used to prioritize traffic. For example, when a TDM FLP is transported as asynchronous traffic, it is assigned the highest priority. The packet length field identifies the length of valid payload within the current packet. The context extension bits are reserved for future use. The one bit BP field identifies a congested state at the remote data transfer bus' receive interface which may be located at RC 105 or AP 110. At RC 105, an active BP bit indicates a full or near full queue condition at the downstream line unit.

In the upstream direction, an active BP bit indicates a full condition at the upstream receive queue of RC 105. A '0' indicates there is no congestion while a '1' indicates the backpressure is active and that there is congestion. The one bit grant BP (GBP) field is used on the upstream data transfer bus only. The GBP bit identifies a congested state at the packet grant FIFO (not shown) of AP 110. A '0' indicates grants are enabled while a '1' indicates grants are disabled and that the grant FIFO of AP 110 is full. Packet arrivals are generated in AP 110 upon receiving a packet from the packet processor. Packet arrival information is stored in the packet arrival field which reports the arrival of packets at the line unit to the Virtual Output Queue (VOQ) image function within an arbiter located within RC 105. The VOQ contains a set of queues that allow traffic destined to different output ports on RAP 115 or with different priority levels to be stored separately. Upon receiving a packet grant word from RAP 115, the VOQ retrieves a packet from the queue designated by the grant VOQ ID and sends the packet to RAP 115. The packet arrival word appears at RC 105 receive and AP 110 transmit interfaces. The packet grant field is sourced by the arbiter of RC 105. It identifies which packet should be driven over the upstream data transfer bus 100 to RC 105 based on the grant VOQ ID. The packet grant word appears at RC 105 transmit and receive interfaces. Because AP 110 at the line unit caches grants, the next upstream packet may not be the last packet granted. The facility ID extension field extends the facility ID to accommodate up to 64 ports. The facility ID field identifies the destination facility for the current packet at the target line unit. The plane ID field is used by RC 105 and AP 110 for supporting four data transfer bus interfaces per line unit slot. RC 105 may be partitioned into four each N-port switching fabric planes. This field allows APs 110 to specify which switching plane a packet is destined for.

The routing map field indicates which output port the current packet is to be routed to at RC 105 with expansion capability for up to 24-ports. The routing map serves no purpose in the downstream path of data transport bus 100 as the packet has already reached its destination at the target line unit. Unicast traffic sets one of twenty four bits. Multicast traffic may set up to twenty four bits active. Each of the bits corresponds to one of twenty four ports. A '0' indicates that the packet must not be routed to the corresponding port while a '1' indicates the packet must be routed to the corresponding RC output port. The flow ID extension field carries flow information in addition to the 16-bit flow ID generated at the Edge Network Processor, Network Packet Processor or AP 110 located in the line unit. The Edge Packet Processor converts multiple 1.544 Mbps DS1 interface to/from fixed-length packets. This packet processor may be configured by software to generate generic 53-byte ATM packets, or packets with additional header bytes that are useful in generating and parsing GigaPoint headers. On the line unit, the Edge Packet Processor is the interface between AP 110 and the DS1 physical interface, a DS1 framer and line interface unit.

The Network Packet Processor provides wire-speed, programmable traffic management functions such as queuing, QoS prioritization, traffic shaping and flow ID assignment/interpretation. The Network Packet Processor is the interface between broadband physical interface devices, such as SONET ATM or POS PHYs and AP 110. Full use of the flow ID and flow ID extension accommodates up to 1 million flows. RC 105 passes the flow ID extension field and does not process its contents. The flow ID field is used by the line units within the shelf to identify individual flows at the Network Packet Processor. RC 105 passes the flow ID field and does not process its contents.

As seen in FIGS. 3C & 6A, ATM header 36 is a standardized multi-byte packet header that includes the VPI, VCI, PTI, CLP and HEC fields. All synchronous TDM packets within a system carry a VPI which identifies individual virtual paths within the system. VCI field 32 of header 30 carries the TDM frame position field and a virtual connection identifier. VCI field 32 is 16 bits long and the frame position field is embedded in the lower 10 bits of VCI field 32. VCI 32 identifies specific sessions or data paths (e.g., multiple applications running on one computer might generate multiple connections). For TDM packets, this number serves two purposes.

First, VCI 32 controls the position of the packet within the 125 microsecond frame, allowing the system to merge packet payloads. Second, VCI 32 acts as a connection identifier in the system. ATM header 36 includes the payload type identifier (PTI) and HEC character.

The first byte of the TDM synchronous packet payload of FIG. 3C is the 1-byte Segment and Reassembly (SAR) AAL-1 Header (Hdr) 34 which is normally intended to identify individual cells within a SAR Packet Data Unit (SAR-PDU). Synchronous TDM FLPs use the Hdr byte 34 to carry information such as frame sequence, parity, and direction. Hdr 34 includes a 6-bit frame sequence value (FSEQ), a direction bit (DIR), and a Parity bit. The DIR bit is set to zero ('0') for traffic from the voice switch to the subscriber and set to one ('1') for traffic from the subscriber to the switch. AP 110 can be configured to set this bit to '0' or '1'. When used as a trunk card, AP 110 must be configured to set the DIR bit to '0'. FSEQ identifies the positions of the TDM packets within a 6 millisecond superframe which provides a 6 millisecond reference to all line units that can be used to synchronize line units to the superframe boundary. The 6-bit FSEQ field is incremented every 125 microsecond frame, cycling from 0 to 47 every 6 millisecond period. A superframe contains forty-eight (48) 125 microsecond frames and the frame sequence field (FSEQ) is reset to zero (0) at the first frame of the superframe. Because the 6-bit frame sequence field rolls over continuously (i.e., the field counts from 0 to 47 and then repeats counting from 0 to 47), the frame sequence information ensures packet alignment to +/−24 frames; referring to the position of the packet over 48 125 microsecond frames. When receiving packets from the packet processor (or Edge Packet Processor) or data transfer bus 100, the 6-bit frame sequence field is used by AP 110 to perform frame synchronization. The frame sequence field is on a per-virtual connection (VC) basis meaning that all virtual circuits are not required to be in the same frame sequence at any given time. When transmitting packets towards the packet processor or data transfer bus 100, AP 110 sets the frame sequence field to the local frame sequence counter. The frame sequence counter is synchronized to the 6 millisecond superframe and common for all VCs. The parity bit is used to detect errors in Hdr byte 34. The parity bit (BIP) is a parity calculation for the seven remaining bits of the header. Software can program AP 110 for even or odd parity. Parity is set to even by default.

As seen in FIG. 3C, B-channel traffic immediately follows Hdr byte 34. The synchronous TDM FLP supports up to thirty B-Channel or DS0 bytes. By default, one DS1 or T1 (24 B-channel) is transported. The six channel expansion capacity allows transport of E1 (30 B-channel) payloads. Further down the packet, fifteen additional bytes transport four signaling bits per B-Channel which includes three bytes of expansion capacity. These signaling bytes, or channels, immediately follow the B-channels. As stated above, there is one nibble (i.e., four bits of signaling) associated with each of the byte voice samples. All nibbles follow one after another sequentially within the packet and the entire block comes right after the B-channel block. As seen in FIG. 3C, superframe (SF) and ESF signaling bits use standard signaling bits (e.g., A1, B1, C1) which are defined in ANSI T1.403.02 standard.

After the signaling channels, there is a Control Byte (CTRL) that allows software to send messages from a trunk card to a line unit card (e.g., POTS or DS1) located in a remote shelf and vice-versa. The trunk card interfaces to the voice switch via T1 lines. At the receive end, AP 110 latches the last non-zero Control Byte value on a per-voice connection (VC) basis. The interval between packets can be less than 125 microseconds at the receiver. If a packet for a given VC arrives before software has read the previous value, AP 110 overwrites the previous value with the new one.

There is a Padding Byte (Pad) at the end of the packet in order to take up space to fill a 64-byte packet.

Information contained in header 38, ATM header 36 and Hdr 34 is used in the routing and merging of packets. A Time Slot Interchange (TSI) function occurs in the AP 110 by taking data from different ports/incoming packets and filling outgoing packets. The absolute limit is 512 TDM packets per frame, or 12,288 DS0s. The VCI field 32 serves two purposes in this embodiment. The VCI field 32 uses the sequence number to control the position of the packet within the TDM frame and allows detection of mis-sequenced, over-booked or dropped packets. Mis-sequence detection is only applied between the AP 110 and the RC 105.

As previously stated, VCI field 32 of each packet contains a TDM Frame Position Field to identify its position as a source packet for merging. As seen in FIG. 6B, VCI field 32 is 16 bits long but the Frame Position Field is found in the lower 10 bits.

The line units include, without limitation, POTS and/or DS1 line units. POTS DS0 traffic and synchronous DS1 (Digital Signal Level 1–1.544 Mbps traffic stream, typically used to carry 24 DS0s as well as their signaling information) traffic are transported in TDM packets. POTS line units can occupy any line unit slot in the shelf and are equipped with multiple lines. DS1 (Digital Signal Level 1–1.544 Mbps data format) line units can also occupy any line unit slot in the shelf and are equipped with multiple lines, each operating at 1.544 Mbps.

As seen in FIG. 1B, each line unit LU1–LUn processes incoming voice traffic VT and data traffic DT before sending the traffic on to the RC 105. DS1, POTS, and Combo Card line units include incoming VT. If the voice traffic VT is in analog form, the traffic must be first sampled and then converted into data by a coder/decoder (CODEC) 120 as the voice traffic is an analog signal coming in. A CODEC performs analog-digital and digital-analog conversion for DS0 channels. CODEC 120 samples the voice traffic at a DS0 rate of one byte per frame. CODEC 120 then generates numbers, based upon the sampling, which are converted into packets. The conversion into packets is performed by AP 110 for POTS which gathers samples until AP 110 has gathered 24 samples, or 24 bytes of information, to form a synchronous TDM packet or multiple sparsely populated synchronous TDM packets. For DS1, this occurs at the Edge Packet Processor. After the voice traffic VT has been digitized and converted into packets, the packets are sent to an appropriate destination by AP 110. AP 110 contains the pre-programmed information, discussed above, regarding correlation of outgoing ports with the intended destination of the traffic. Based on the origin of the traffic and the intended destination of the traffic, RC 105 uses the pre-programmed instructions to determine which outgoing port on the line unit the packet must be sent through.

Data traffic DT is sent directly to AP 110 as data traffic DT is already in digital format. However, data traffic headers must be translated to the data transfer system format, as seen in FIG. 3C. Every path through RC 105 will be identified by an internal Routing Map/Flow ID. Headers are adapted upon ingress to the internal Routing Map and on egress back to a standard header format. RC 105 is designed to pass either fixed length cells (e.g., ATM cells) or variable length packets (e.g., IP) with minimal adaptation. Depending on line unit type, the outside header is adapted to the internal format in AP 110 for DS1 line units and at the Network Packet Processor for SONET line units. AP 110 sends both the digitized voice traffic VT and data traffic DT to a Serializer/Deserializer (SerDes) 125. SerDes 125 converts the traffic from parallel into serial and from serial to parallel.

Figure 4:
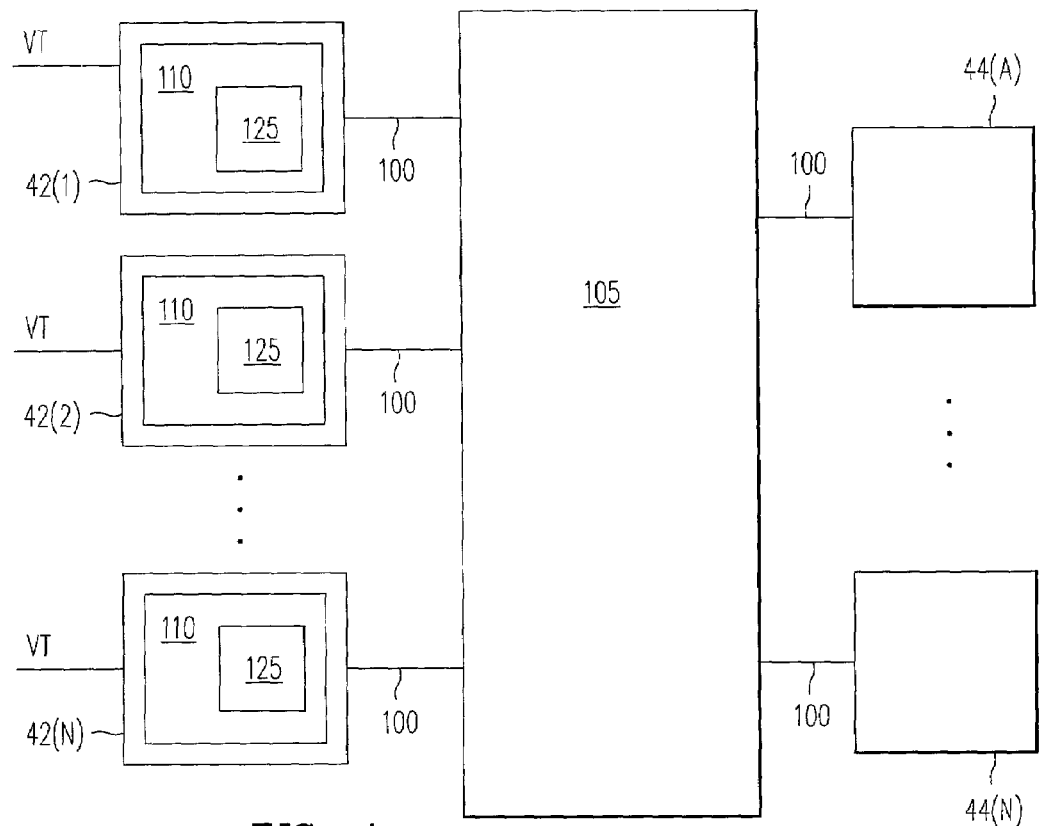
FIG. 4 illustrates Line Units, Access Processor, SerDes, and Routing Crossconnect.

FIG. 4 illustrates line units 42(1)–42(N) (where 1<N<N+1), target line units 44(1)–44(N) (where 1<N<N+1), and RC 105 on a shelf. SerDes 125 is located inside AP 110. An AP 110 is located inside each line unit 42(1)–42(N) as well as in each target line unit 44(1)–44(N). As stated above, traffic going into the line units are formed into TDM synchronous packets in AP 110 or in the Edge Packet Processor. The packets are then sent to RC 105 where traffic may be merged and then routed to a target line unit 44(1)–44(N). There is a SerDes 125 located within AP 110. At RC 105, synchronous TDM packets meeting certain criteria may be merged and routed to a target line unit while other synchronous TDM packets are merely routed to a target line unit without being merged. AP 110 interfaces between RC 105 on RAP 115 and Line Units 42(1)–42(N). AP 110 performs the following functions: receive and transmit TDM and packet based traffic; transmit local queue status; receive control and arbitration information; interface up to twenty-four physical interfaces on a Line Unit; interface to a packet processor; map POTS CODEC traffic into the system internal packet format; classification of traffic streams into classes of service (CoS); slice packets into fixed length packets (FLPs).

DS0 sources are any line units that provide an interface to analog, T1 (Transport carrier level 1–1.544 Mbps transmission signal) or SONET (Synchronous Optical Network) multiplexed voice channels. With a greater number of DS0 channels, the minimum required data transport rate increases. Possible sources of DS0 traffic are: POTS line unit; POTS/DSL; DS1 or T1 trunk; STS-1; and OC-N (e.g., OC-3, OC-12 and OC-48).

Each source line unit (LU1–LUn) must encapsulate its DS0 channels into TDM packets (FIGS. 3A–3C) for transport. POTS line units encapsulate DS0s at AP 110. AP 110 is capable of generating multiple TDM packets carrying twenty-four DS0 channels (with expansion capacity for thirty DS0s). Higher bandwidth DS1 source line units, such as DS1 line units, encapsulate DS0s at a Edge Packet Processor. The Edge Packet Processor receives DS0 traffic from the DS1 framers over individual T1/E1 buses. After encapsulation, the Edge Packet Processor drives the TDM packets to AP 110 as ATM cells. At the egress path, the process occurs in the reverse order. AP 110 expands the packet processor TDM packets to up to 512 synchronous TDM packets. A Time Slot Interchange (TSI) function in AP 110 sparsely populates up to 512 TDM packets in expanded format. The expansion consists of selecting any DS0 channel in any of the TDM packets received from the Edge Packet Processor and mapping it to any DS0 channel in any of the 512 TDM packets to be sent by AP 110 towards RC 105.

Figure 5A:
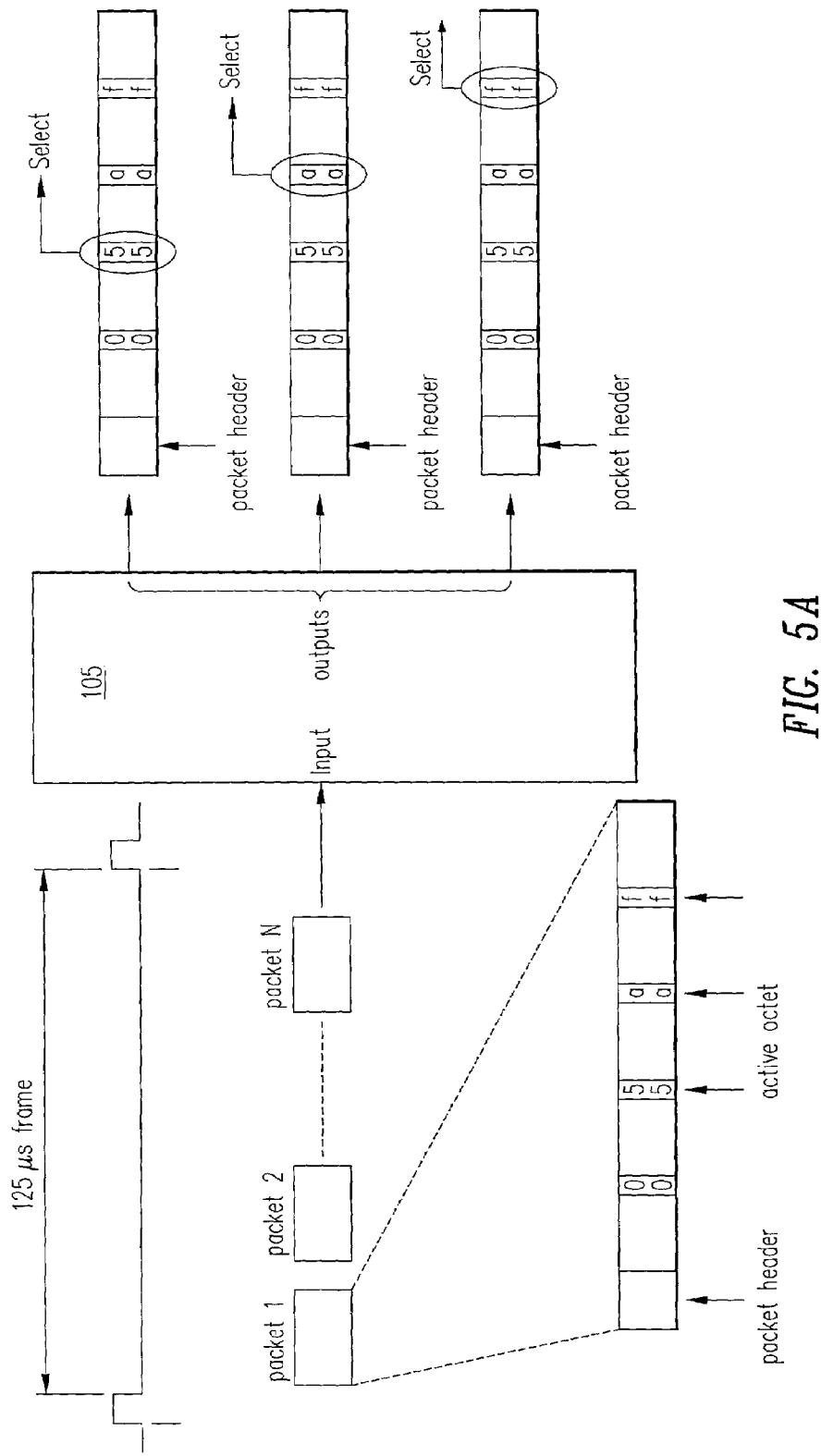
FIG. 5A illustrates a scatter function.
Figure 5B:
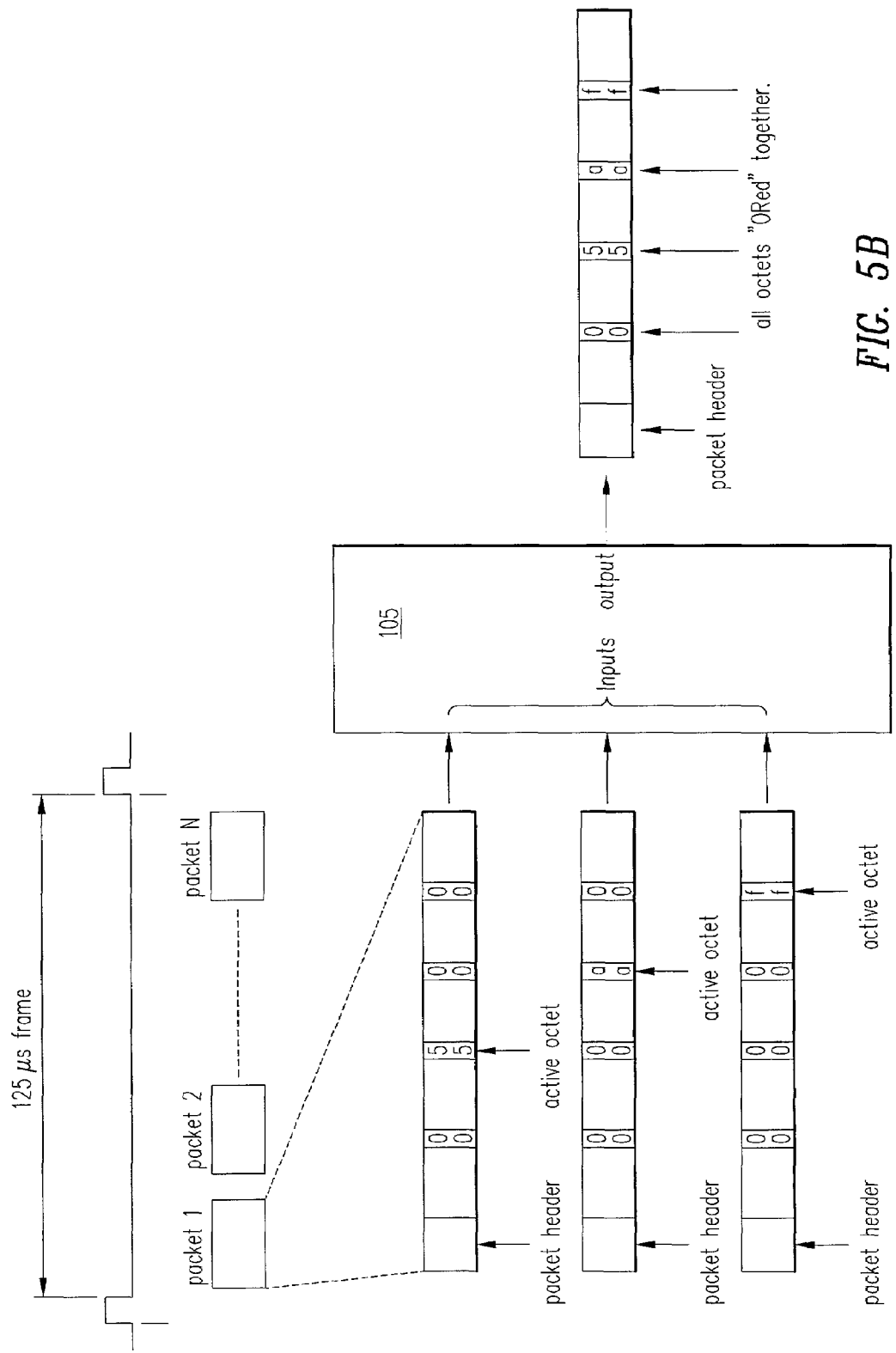
FIG. 5B illustrates a gather function.

As seen in FIGS. 5A and 5B, RC 105 transports TDM (e.g., POTS and DS1-GR303) via a "scatter process" (FIG. 5A) and a "gather process" (FIG. 5B). In this embodiment, TDM packets are merged at DS1 or POTS shelves. The scatter process is the process of distributing TDM traffic away from RC 105. There are "N" number of packets sent per every 125 microsecond frame (where 1<N<N+1). FIG. 5A illustrates a TDM packet entering RC 105 with three DS0 data channels containing actual voice traffic (i.e., active octet). The 24-bit Routing Map embedded in the TDM packet header has multiple bits set. Each bit corresponds to an outgoing port on RC 105 that the packet must be forwarded to. As the packet enters RC 105, the packet is replicated and sent to all destinations. The gather process is the process of collecting and merging TDM packets inside RC 105 and sending the merged TDM packet to a destination. FIG. 5B illustrates multiple packets entering RC 105 on different input ports. Each packet carries voice traffic in an exclusive position shown as the active octet. The packets also occupy the same position within the 125 microsecond frame.

The Frame Position Field of all packets are identical and correspond to the position of the packet within the frame. The 24-bit Routing Map field embedded in the TDM packet header is programmed such that all packets are going to the same output port on RC 105. As packets enter RC 105, all packets are merged to form a single packet that is then sent out on the output port.

For the scatter and gather process to function, TDM data must be mapped in two dimensions in participating line units. TDM data must be mapped into 1 of 24 possible B-channels within a selected TDM packet (FIG. 3C). Signaling associated with the data is mapped into 1 of 24 possible nibbles within a selected TDM packet (FIG. 3C). The formatted packet is then scheduled once per every 125 microseconds frame. Each unique TDM packet must be scheduled accurately within the 125 microsecond frame to allow discrimination of the involved scatter/gather logic. TDM packets are created and terminated within AP 110 on the POTS line unit and in both AP 110 and the packet processor on the DS1/T1 line unit.

Unused positions must be nulled to zero on a static configuration basis. Active DS0 channels (up to 24) must be transferred to/from the CODEC port every 125 microsecond frame.

Towards AP 110, the Edge Packet Processor on the DS1 line unit maps the DS1 (T1) channels to selected positions anywhere in a scheduled sequence of up to 28 packets per 125 microsecond frame. If the Edge Packet Processor formatting function alone is inadequate, AP 110 may provide an expansion and nulling function. AP 110 may expand up to 512 packets from the 28 packets emitted from the Edge Packet Processor per frame. The nulling function can set any position in the 512 packets to zero. These functions facilitate packet merging within RC 105.

When merging is not required, packets containing DS0 information may be routed as asynchronous traffic in AP 110 and RC 105. Packets carrying DS0 traffic have highest priority. There are multiple queues in AP 110 to support multiple classes of service (CoS).

Figure 9:
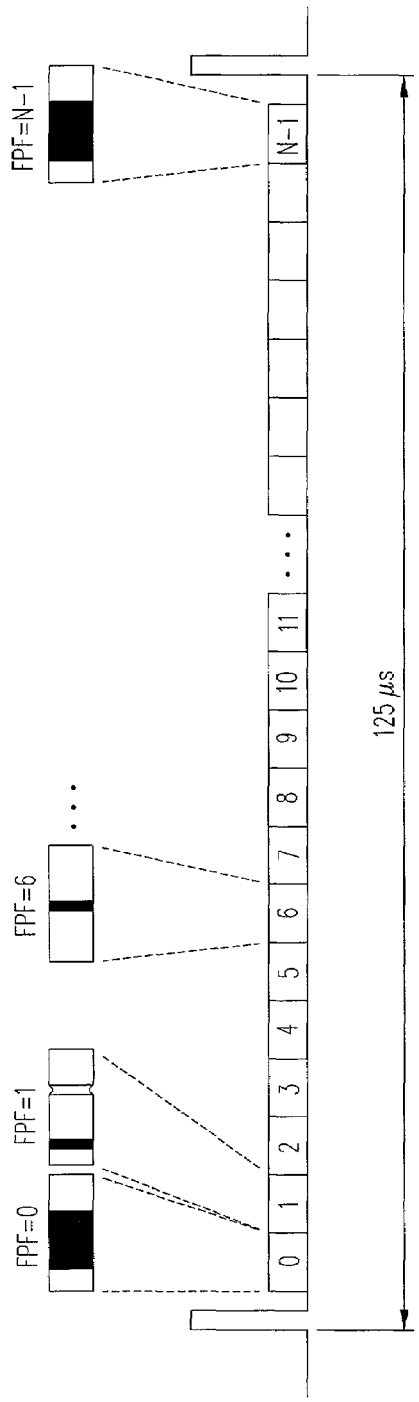
FIG. 9 illustrates a TDM Frame Position Field in a 125 microsecond frame.

Each Frame Position Field value in the VCI field is unique to a specific position within a frame. Each bit within the Routing Map identifies a particular destination and directs a packet to that particular destination. RC 105 cross-point will merge the payloads of all incoming packets that occupy the same position and share a common output (i.e. destination). For example, in an RC 105 with N number of ports (N≧1), each port represents a destination for a system with N line units. If two bits (i.e., two destinations) in the Routing Map are set, the packet is multicast to the respective two ports representing each destination. Within the system, an upstream (traffic from the AP(s) to the RC) or downstream (traffic from the RC to the AP(s)) TDM packet with a specific Frame Position Field value is transported between shelves once per frame. The frame position is relative to the 125 microsecond frame. TDM packets, when transported over a SONET interface, do not have nor require a specific alignment to the transport overhead positions. As TDM users are added, DS0 channels become active at specific locations in the TDM frame. Consequently, TDM packets may be fully or partially populated with active DS0 channels. Some may even be empty, i.e., all DS0 channels inactive in that shelf. Empty packets are not transmitted over data transport bus 100 but the frame position is maintained, as show in FIG. 9 (e.g., packet with FPF 2 to 5 are not transmitted).

TDM packets from the line units bound for RC 105 are scheduled for two specific reasons. First, to enable TDM packet merging at RC 105. Second, to reserve specific bandwidth over all paths the TDM packet traverses. TDM packets from two or more sources may be merged as they are routed through the crosspoint in RC 105 (FIG. 5B). Because RC 105 has a minimum of buffering for synchronous packets, each line unit must position packets that are to be merged in the same position within the 125 microsecond frame. The TDM merge function within RC 105 ORs (a hardware driven function) individual DS0 bytes within TDM packets received by RC 105 from multiple source line units. Each DS0 byte within a TDM packet may have more than one source when used as quarter channels. The bytes not driven by a line unit hold a value of '00'. TDM packets with matching Frame Position Field values and destinations are merged. These packets are referred to as "TDM strictly scheduled" packets as they occupy a fixed position within the frame. TDM packets (upstream and downstream), not intended for merge, are assigned unique positions in the 125 microsecond frame independent of the Frame Position Field. These packets are referred to as "TDM loosely scheduled" packets as the position they occupy within the 125 microsecond frame is not dictated by the Frame Position Field.

DS0 traffic is assigned to specific channels at the source line unit. The system software sends messages to each line unit instructing the line unit to allocate certain DS0s in its packet but the line unit may not allocate other DS0s as they may be used by other line units. TDM packets are generated at a line unit 42(N) (which can support telephony traffic as follows: POTS, DS1, SLU) and transported to RC switch 105 (see FIG. 4). RC switch 105 routes the packet to the appropriate one or more target line unit(s) 44(1)–44(N) based on a routing map within the GigaPoint header 38 (FIG. 3C). Specifically, the Frame Position Field of this example is encoded in the least significant bits "LSBs" at the TDM packet source (e.g., line unit 42(2) of FIG. 4).

At the RAP switch or RC 105, TDM packets, with the same Frame Position Field value from different source line units (42(1)–42(N)) and with common destinations, are merged in one embodiment (FIG. 5B). The gather function relies on each of the line units (42(1)–42(N)) that is sourcing packets to exclusively drive DS0s at software-assigned timeslots within the TDM packets. RAP 115 performs a simple logical OR function of each byte while merging TDM packet payloads.

If a source line unit (LU1–LUn) has DS0 data destined for multiple targets, the packet is multicast by RAP 115 to each target. The target line units (LU1–LUn) extract the DS0 data destined to themselves from the TDM packet, based on software control. FIG. 5A shows each destination or target line unit selecting the appropriate DS0 within the TDM payload.

As stated above, FIG. 4 illustrates line units 42(1)–42(N), RC 105 and target line unit 44(1)–44(N). The AP 110 located within each line unit performs the following functions: packet scheduling, header insertion, and TDM alignment. TDM packets are generated at the line unit (e.g., POTS units, port DS1 unit, and SONET line unit) and transported over the line unit's data transfer bus 100 to the RAP 115. By default, each TDM packet carries the equivalent of a T1 line (i.e., twenty-four DS0 channels and their related signaling data). Additional capacity for a total of thirty DS0s with signaling allow support for 30 port E1 interfaces. At the DS0 ingress path, each source line unit must encapsulate DS0 channels into TDM packets for transport. POTS cards encapsulate DS0s at AP 110. AP 110 is capable of generating multiple TDM packets; typically one packet per line.

Figure 7:
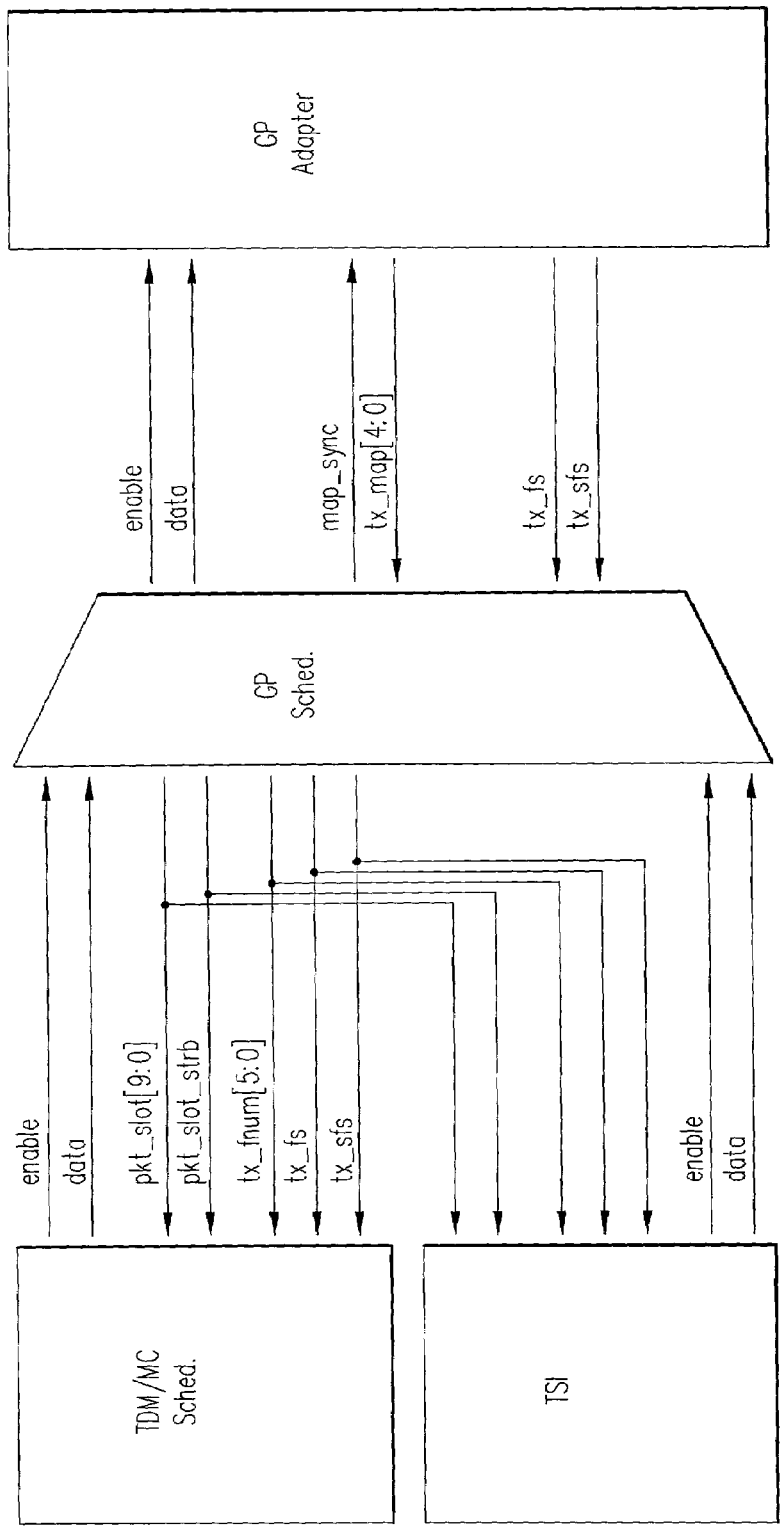
FIG. 7 illustrates the TDM Aligner Block Diagram.

The data transport bus scheduler, as seen in FIG. 7, is responsible for scheduling packets at the right time such that they fall in an appropriate packet slot on data transfer bus 100. The scheduler takes into account the number of data transfer bus (GigaPoint) channels (each channel equivalent to STS-1) allocated to synchronous traffic when calculating the current packet slot and interval between packets. The information is passed to the TDM/Multicast scheduler, see below, and to the TSI that are responsible for launching packets. The TDM/Multicast scheduler is responsible for launching "loosely scheduled" packets. These packets do not occupy a fixed position within the 125 microsecond frame. FIG. 7 illustrates the four components involved in the scheduling of TDM packets. The TDM/Multicast Scheduler as well as the Time Slot Interchange (TSI) send fixed length packets to the GP Scheduler through data lines (data).

Enable lines (enable) indicates when data is present on the data lines; "0" indicating that no data is present and "1" indicating that data is present. The TSI has the ability to position packets at specific locations in the frame based on the Frame Position Field whereas the TDM/MC Scheduler sends packets on a first come/first served basis independent of the Frame Position Field.

Figure 10:
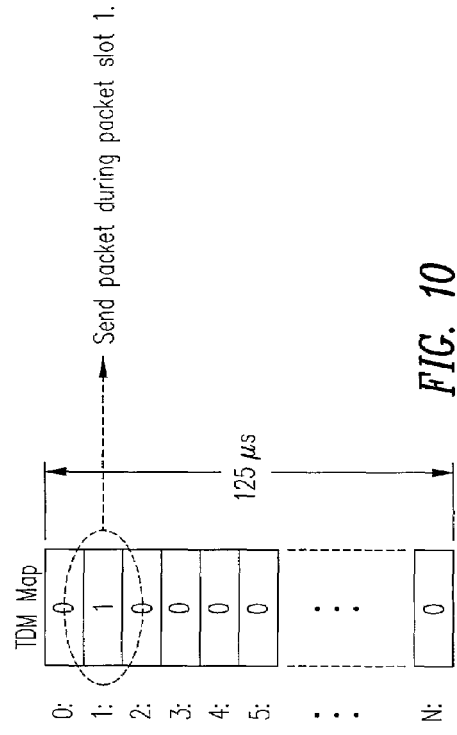
FIG. 10 illustrates a software programmable map.

The GP Scheduler forwards packets from the TSI or the TDM/MC Scheduler to the GP Adaptation block. The GP Scheduler also provides synchronization information to the TDM/MC Scheduler and the TSI such as the current packet slot (pkt-slot) and the current frame (tx-fnum). The TDM/MC Scheduler and the TSI contain software programmable maps, as shown in FIG. 10. Each location in the map corresponds to a packet slot on data transfer bus 100 and instructs the TDM/MC Scheduler and the TSI whether to send a packet or not during the corresponding packet slot indicated by the GP Scheduler block; "0" indicating not to send a packet and "1" indicating to send a packet.

Figure 8:
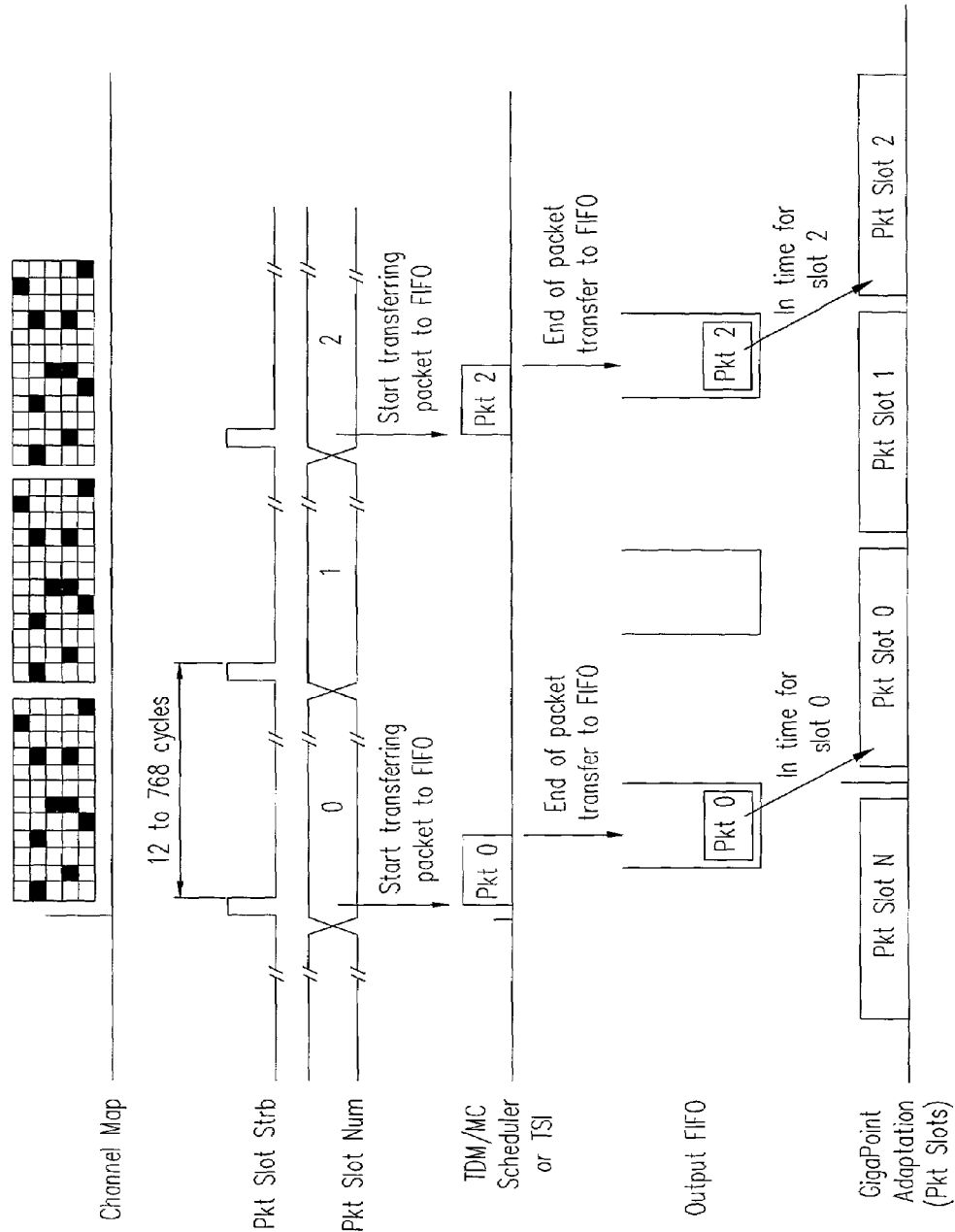
FIG. 8 illustrates the GigaPoint Scheduler Operation.

FIG. 8 shows how the data transport bus scheduler operates. The scheduler provides a "Packet Slot Strobe" signal along with a "Packet Slot Number" to the TDM/Multicast Scheduler and the TSI. These signals indicate when to start transferring a packet for a given slot on data transfer bus 100. The strobe signal is programmed in advance such that the end of a packet transfer is slightly before the start of the actual slot on data transfer bus 100. The actual mapping of packets to data transfer bus channels is accomplished in the GigaPoint Adaptation module which maps each individual byte of the fixed length packet to designated intervals on data transfer bus 100. FIG. 8 illustrates the several steps required to launch a packet. First, the channel map information which specifies which byte intervals are used to carry synchronous packets on transfer bus 100 is used to generate a strobe signal (Pkt Slot Strb). The strobe signal marks the beginning of a new packet (64-bytes) and is used to increment the slot number (Pkt Slot Num). The strobe signal and the slot number are passed to the TDM/MC Scheduler and the TSI that decide to send a packet or not based on software provisioning. If a packet is sent, it is temporarily stored in a FIFO until it can be read by the GigaPoint Adaptation block. The interval between packet slot strobes is a function of the number of channels allocated for synchronous traffic. The data transfer bus scheduler counts the number of synchronous packet opportunities available on data transfer bus 100 based on the channel map information and generates a strobe every 64 bytes (the length of a FLP). The channel map information is provided by the GigaPoint Adaptation module five channels at a time and repeats every 12 cycles for a total of 60 channels.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as falling within the true spirit and scope of this invention.

We claim:

1. A method of merging traffic, the method comprising:
   receiving a plurality of messages from at least two sources;
   wherein each message comprises a frame position field value and a payload;
   positioning each of at least two of said plurality of messages at a common location within a superframe wherein the frame position field value contained within each of the at least two messages are identical;
   positioning at unique locations in the superframe, messages of said plurality that have different frame position field values;
   merging the payloads of the at least two messages containing identical frame position field values to create a merged payload; and
   routing the merged payload to a port.

2. The method of claim 1, wherein the at least two messages are received at a switch prior to merging.

3. The method of claim 1, wherein the messages are merged at a switch.

4. The method of claim 1, wherein prior to merging each of the at least two messages is directed to an identical destination or a common plurality of destinations.

5. The method of claim 1, wherein the plurality of messages are further comprised of fixed length packets.

6. The method of claim 5, wherein the fixed length packets are TDM packets.

7. The method of claim 3, wherein the switch performs a simple OR function when merging the messages.

8. The method of claim 1, wherein the port is an output port on a switch.

9. The method of claim 3, wherein the port is an output port on the switch.

10. The method of claim 1, further comprising:
    multicasting a message targeted to a plurality of destinations to each destination wherein the message is multicast by a switch.

11. The method of claim 1, further comprising:
    aligning each of the at least two messages.

12. The method of claim 1, wherein there are 48 microsecond frames per each superframe and each start of a superframe is coincident with a frame sync pulse.

13. The method of claim 1, wherein the superframe is at the source of each of the at least two messages.

14. The method of claim 1, wherein the messages that are not merged are positioned at locations within the superframe independent of the frame position field values within each message that is not merged.

15. A system for merging traffic, comprising
    means for receiving a plurality of messages from at least two sources;
    wherein each message comprises a frame position field value and a payload;
    means for positioning each of at least two of said plurality of messages at a common location within a superframe wherein the frame position field value contained within each of the at least two messages are identical;
    means for positioning at unique locations in the superframe, messages of said plurality that have different frame position field values;

means for merging the payloads of the at least two messages containing identical frame position field values to create a merged payload; and means for routing the merged payload to a port.

16. The system of claim 15, wherein prior to merging each of the at least two messages is directed to an identical destination or to a common plurality of destinations.

17. The system of claim 15, wherein the plurality of messages are further comprised of fixed length packets.

18. The system of claim 15, wherein the fixed length packets are TDM packets.

19. The system of claim 15, wherein the means for merging performs a simple OR function when merging the messages.

20. The system of claim 15, wherein the messages that are not merged are positioned at locations within the superframe independent of the frame position field values within each message that is not merged.

* * * * *